A. DARRACH.
BACK STOP FOR SLIDING DOORS.
APPLICATION FILED FEB. 9, 1910.
961,758.
Patented June 21, 1910.
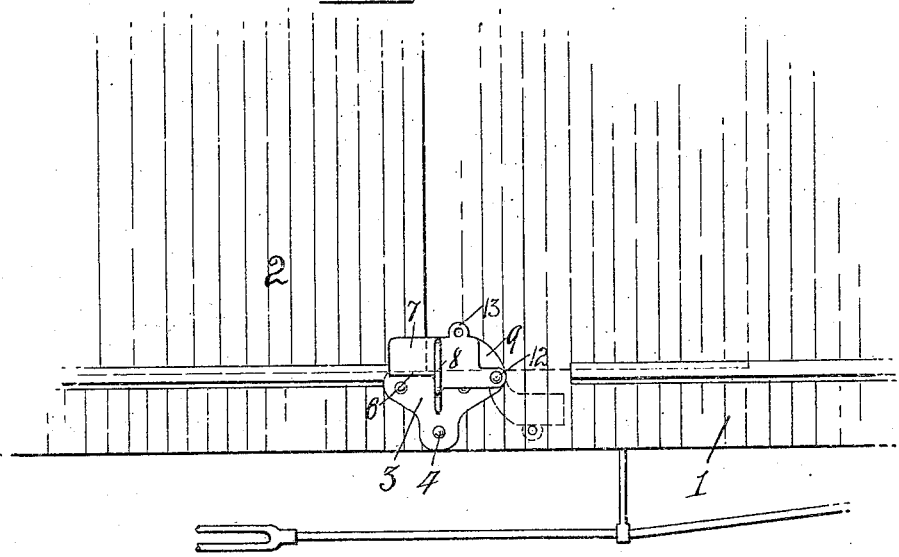
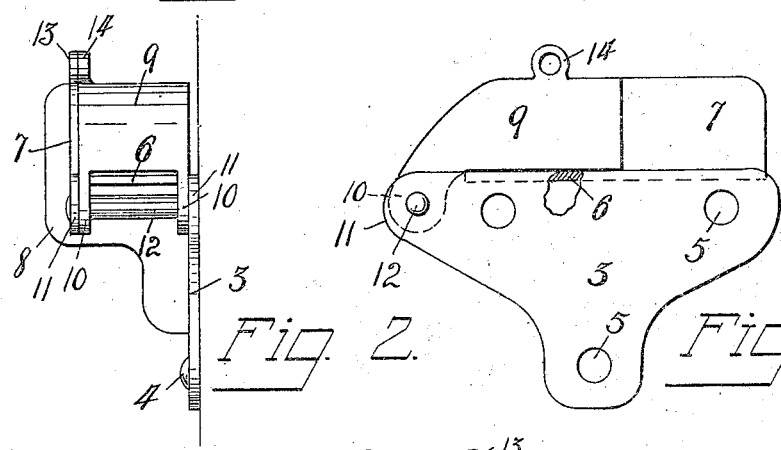
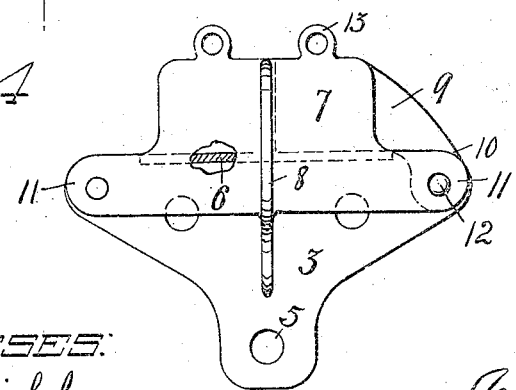
WITNESSES:
C. H. Bills.
E. E. Thomas.
INVENTOR.
Angus Darrach,
By Owen & Owen,
His attys.

UNITED STATES PATENT OFFICE.

ANGUS DARRACH, OF SARNIA, ONTARIO, CANADA.

BACK-STOP FOR SLIDING DOORS.

961,758.   Specification of Letters Patent.   Patented June 21, 1910.

Application filed February 9, 1910. Serial No. 542,948.

*To all whom it may concern:*

Be it known that I, ANGUS DARRACH, a citizen of Canada, and a resident of Sarnia, in the county of Lambton and Province of Ontario, Canada, have invented a certain new and useful Back-Stop for Sliding Doors; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to devices for limiting the opening of car doors, and is intended more particularly for use in connection with the side doors of freight cars, but is not restricted to such use as it may be employed in any connection for which it may be adapted or appropriate.

The object of my invention is the provision of a simple, strong and efficient device of this class, which is applicable for use in connection with the rear or back edge of a car door and capable of securely locking the door against an opening movement, or of permitting a free unrestrained opening of the door, and which, when in locking position, is adapted to be sealed against opening by the ordinary car door seal.

The invention is fully described in the following specification, and a preferred embodiment of the same is illustrated in the accompanying drawings, in which,—

Figure 1 is a side elevation of a portion of a freight car with my invention associated therewith. Fig. 2 is an outer end view of the stop embodying the invention, Fig. 3 is an inner side view thereof with a portion broken away, and Fig. 4 is a slightly modified form thereof with a portion broken away.

Referring to the drawings, 1 designates a freight car body and 2 a side door thereof of the usual sliding type. Secured to the side of the car body adjacent the lower rear corner of the door 2, when in closed position, is a bracket or holder 3, which comprises a part of my invention and is secured to the car body by bolts 4 passing through openings 5 therein, or in any other suitable manner. This bracket is formed at its upper edge with a lateral outwardly projecting ledge or flange 6, which at its outer edge is formed with an upwardly extending guide-flange 7. The ledge or flange 6 is disposed immediately below the path of movement of the lower edge of the door, while the flange 7 is spaced a sufficient distance from the car side to permit the door to slide freely therebetween, but holds the same against lateral play. 8 designates a strengthening web or flange for the ledge 6 and guide flange 7.

A stop-block 9 is disposed on the top of one end portion of the ledge 6 and has apertured ears 10, 10 projecting from an end thereof down between the apertured ears 11, 11 of the bracket, which ears are formed at the adjacent ends of the holder 1 and the flange 7 by an extension of such parts beyond the ledge 6, as indicated. The ears 10 are pivoted to the ears 11 by a bolt or pin 12, thus adapting the stop-block 9 to be swung down at one end of the bracket out of the path of movement of the door, when it is desired to open the door. If desired each end of the holder 1 and flange 7 may be provided with ears 11, 11, as indicated in Fig. 4, thus enabling the block 9 to be hinged to either end of the bracket to adapt the device for use at either the right or left of a door.

Eyes 13 and 14 are provided in registering positions on adjacent edges of the flange 7 and block 9, respectively, when the block is in door locking position. These eyes are intended to receive an ordinary car seal or other suitable locking device to prevent an unauthorized opening of the block 9 relative to the holder 1.

It is apparent in the use of my device that it provides a rigid, strong and substantial back-stop for a door, coöperates with the customary locking means at the front edge of a door to secure the same against movement, and serves as a guide for the sliding movements of a door.

I wish it understood that my invention is not limited to any specific construction or arrangement of the parts except in so far as such limitations are specified in the claim.

Having thus described my invention, what I claim as new and desire to secure by Letters Patent, is,—

The combination with a sliding door of a car, of a bracket secured to the car at the lower rear corner of the door, said bracket having a horizontal ledge immediately beneath the plane of movement of the door which terminates at its outer edge in an upwardly projecting flange and provided at the ends of the ledge with perforated ears, a stop-block capable of being hinged to the ears at either end of the bracket and adapted to rest upon the ledge with its other end adjacent the rear edge of the door to prevent a movement of the door in one direction and adapted to be thrown to inoperative position below the plane of the door, substantially as described.

In testimony whereof, I have hereunto signed my name to this specification in the presence of two subscribing witnesses.

ANGUS DARRACH.

Witnesses:
J. KENT GEDDES,
ANNABEL KENNEDY.